(12) United States Patent
Kamachi et al.

(10) Patent No.: US 7,846,602 B2
(45) Date of Patent: Dec. 7, 2010

(54) THERMOELECTRIC CONVERSION APPARATUS

(75) Inventors: Atsushi Kamachi, Utsunomiya (JP); Shunsuke Itami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 868 days.

(21) Appl. No.: 11/786,357

(22) Filed: Apr. 11, 2007

(65) Prior Publication Data

US 2007/0235325 A1 Oct. 11, 2007

(30) Foreign Application Priority Data

Apr. 11, 2006 (JP) .............................. 2006-108854

(51) Int. Cl.
*H01M 8/04* (2006.01)

(52) U.S. Cl. .................. 429/433; 429/436; 429/479; 429/490; 429/513; 136/205; 62/3.2; 62/3.3; 62/3.61

(58) Field of Classification Search .................. 429/19, 429/20, 26, 30, 34, 38, 39, 433, 436, 479, 429/490, 513; 136/205; 60/39.15, 272, 278, 60/320, 324; 62/3.2, 3.3, 3.61, 236, 238.3; 165/41, 42, 43, 202

See application file for complete search history.

(56) References Cited

U.S. PATENT DOCUMENTS

| | | | |
|---|---|---|---|
| 7,041,272 B2 * | 5/2006 | Keefer et al. ................ 423/651 |
| 7,055,337 B2 * | 6/2006 | Horn et al. .................... 62/199 |
| 7,629,530 B2 * | 12/2009 | Inaoka ........................ 136/205 |
| 2001/0014415 A1 * | 8/2001 | Iio et al. ....................... 429/22 |
| 2002/0119352 A1 * | 8/2002 | Baldauf et al. ................ 429/13 |
| 2003/0143448 A1 * | 7/2003 | Keefer .......................... 429/26 |
| 2004/0060292 A1 * | 4/2004 | Minemi et al. ............... 60/616 |
| 2005/0247336 A1 * | 11/2005 | Inaoka ........................ 136/205 |
| 2006/0003201 A1 * | 1/2006 | Gurin et al. ................... 429/17 |
| 2006/0010866 A1 * | 1/2006 | Rehg et al. ................. 60/641.8 |
| 2006/0026981 A1 * | 2/2006 | Inaba et al. ................ 62/238.6 |
| 2006/0191676 A1 * | 8/2006 | Horn et al. .................. 165/202 |
| 2006/0257708 A1 * | 11/2006 | Keefer et al. ................. 429/34 |
| 2006/0280993 A1 * | 12/2006 | Keefer et al. ................. 429/34 |

FOREIGN PATENT DOCUMENTS

JP 2005-033960 2/2005

* cited by examiner

*Primary Examiner*—Bruce F Bell
(74) *Attorney, Agent, or Firm*—Lahive & Cockfield, LLP; Anthony A. Laurentano (57) ABSTRACT

A thermoelectric conversion apparatus has an evaporator for heating a working medium in liquid-phase to evaporate the working medium, an electric generator for forming a concentration cell for electric power generation when it is supplied with a reactive gas and the working medium evaporated by the evaporator, and a gas-liquid separator for being supplied with a mixed gas of the working medium and a cathode off-gas discharged from the electric generator and separating the mixed gas into the working medium and the reactive gas. The thermoelectric conversion apparatus also has an anode supply passage for supplying the reactive gas separated by the gas-liquid separator to the electric generator, and a cathode supply passage for supplying the working medium separated by the gas-liquid separator through the evaporator to the electric generator.

10 Claims, 5 Drawing Sheets

THERMOELECTRIC CONVERSION APPARATUS

BACKGROUND OF THE INVENTION

1. Field of the Invention

The present invention relates to a thermoelectric conversion apparatus for converting thermal energy into electric energy.

2. Description of the Related Art

Using a thermoelectric conversion apparatus for the conversion of waste heat discharged from an internal combustion engine, a fuel cell, etc., for example, into electric energy makes it possible to greatly increase the overall efficiency of a system including such a thermoelectric conversion apparatus.

For example, thermoelectric devices and the Rankine cycle are known for use in thermoelectric conversion processes for converting thermal energy into electric energy. However, the thermoelectric devices are disadvantageous in that their materials suffer a low performance level. The problem of the Rankine cycle is that an expander causes a large loss especially for small-scale electric power generation. Both the thermoelectric devices and the Rankine cycle fail to achieve a sufficient conversion efficiency.

Japanese Laid-Open Patent Publication No. 2005-33960 discloses a thermoelectric conversion fuel cell that operates according to an electrochemical process using a hydrogen storage alloy and a hydrogen concentration cell. The thermoelectric conversion fuel cell is advantageous in that the conversion efficiency is not liable to be affected by the scale of electric power generation and in that the mechanical loss is small.

The thermoelectric conversion fuel cell has an electrolytic membrane (proton-conducting membrane) made of a solid polymer. Thus, the electrolytic membrane needs to be humidified. However, the hydrogen storage alloy is unable to function sufficiently in the presence of water.

SUMMARY OF THE INVENTION

It is a general object of the present invention to provide a thermoelectric conversion apparatus which does not need to employ a hydrogen storage alloy, etc. and is capable of converting thermal energy into electric energy highly efficiently.

According to the present invention, there is provided a thermoelectric conversion apparatus comprising an evaporator for heating a working medium in liquid-phase to evaporate the working medium, an electric generator having an anode electrode for being supplied with a reactive gas and a cathode electrode for being supplied with the working medium evaporated by the evaporator, the electric generator forming a concentration cell for electric power generation when the anode electrode is supplied with the reactive gas and the cathode electrode is supplied with the evaporated working medium, a gas-liquid separator for being supplied with a mixed gas of the reactive gas which has reacted in the concentration cell and the working medium, from the cathode electrode, and condensing the working medium to separate the mixed gas into the working medium and the reactive gas, a first supply passage for supplying the reactive gas separated by the gas-liquid separator to the electric generator, and a second supply passage for supplying the working medium in liquid phase separated by the gas-liquid separator through the evaporator to the electric generator.

With the above arrangement, a closed-cycle system is constructed as a combination of the Rankine cycle and the concentration cell. The thermoelectric conversion apparatus is capable of converting thermal energy into electric energy highly efficiently while effectively employing waste heat discharged from an internal combustion engine, a fuel cell, or the like as a heat source for heating the working medium in the evaporator.

The thermoelectric conversion apparatus may further include an expander connected to the second supply passage between an outlet of the evaporator and an inlet of the electric generator, the expander being driven by the working medium evaporated by the evaporator, and a compressor connected to the first supply passage between an outlet of the gas-liquid separator and an inlet of the electric generator, the compressor being rotated coaxially with the expander for compressing the reactive gas supplied to the electric generator. The expander is capable of effectively recovering pressure energy and kinetic energy of the evaporated working medium, i.e., a water vapor, to enable the compressor to pressurize the reactive gas, i.e., a hydrogen gas. The pressure of hydrogen in the anode electrode can thus be increased to increase an electromotive force generated by the electric generator.

The thermoelectric conversion apparatus may further include a first discharge passage for discharging an unreacted reactive gas from the anode electrode, a second discharge passage for discharging the mixed gas from the cathode electrode, and an ejector. The first discharge passage may be connected to the second discharge passage or the first supply passage through the ejector. With this arrangement, the unreacted reactive gas discharged from the anode electrode can be circulated more efficiently.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Thermoelectric conversion apparatus according to embodiments of the present invention will be described in detail below with reference to the accompanying drawings.

Figure 1:
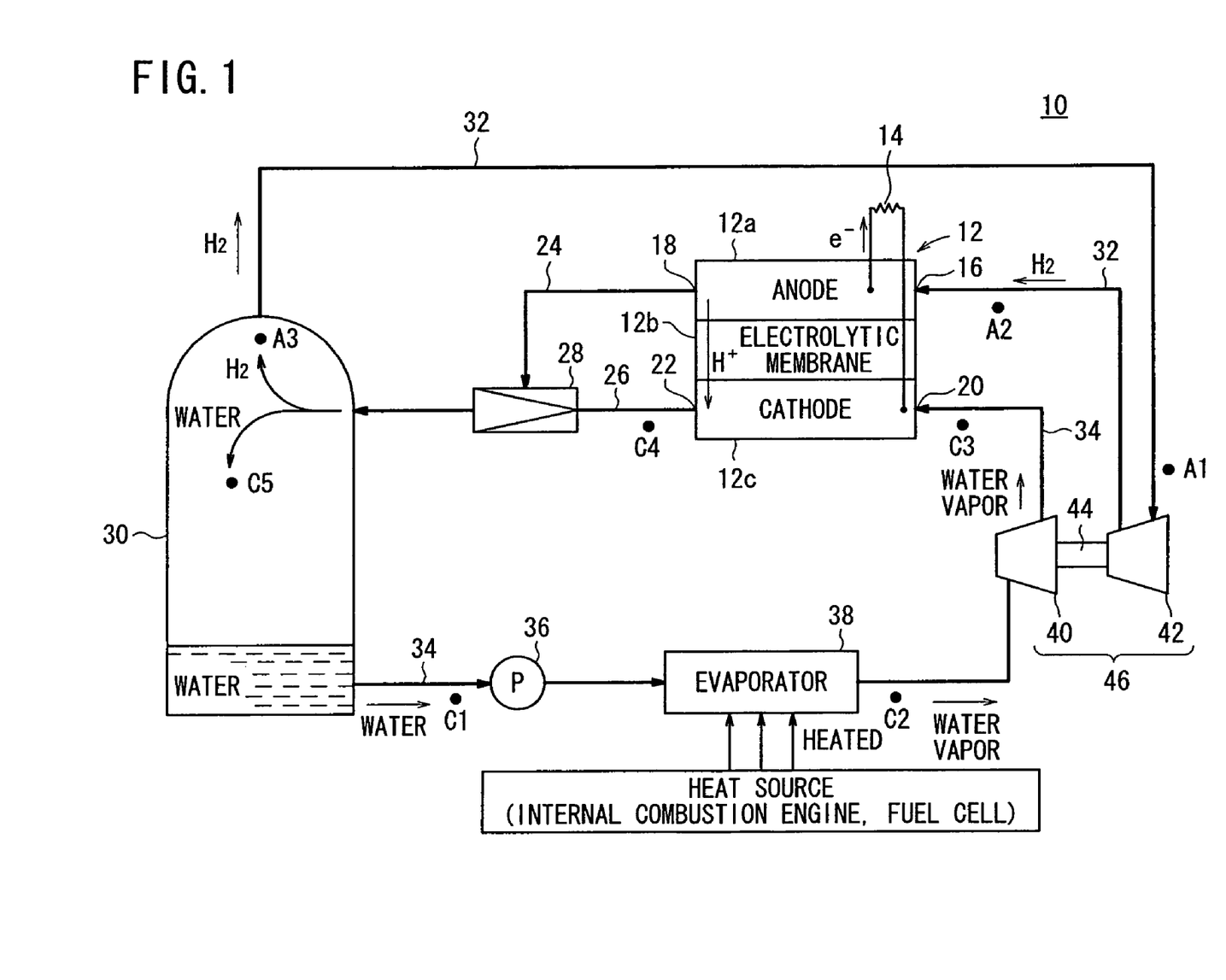
FIG. 1 is a schematic diagram of a thermoelectric conversion apparatus according to a first embodiment of the present invention.

FIG. 1 schematically shows a thermoelectric conversion apparatus 10 according to a first embodiment of the present invention.

As shown in FIG. 1, the thermoelectric conversion apparatus 10, which is in the form of a closed-cycle system, evaporates a working medium of water into a water vapor with a heat source of waste heat discharged from an internal combustion engine, a fuel cell, or the like (not shown), and supplies the water vapor and a hydrogen gas sealed as a reactive gas in the system to an electric generator 12 to form a concentration cell for electric power generation. The reactive gas may be an oxygen gas or the like rather than a hydrogen gas, and the working medium may be alcohol, ammonia, or the like rather than water.

The electric generator 12 is of a cell structure comprising an anode electrode 12a, a cathode electrode 12c, and an electrolytic membrane 12b sandwiched between the anode electrode 12a and the cathode electrode 12c. The electric generator 12 is of essentially the same configuration as known fuel cells. The electric generator 12 may comprise a plurality of cells stacked into an integral stack structure. The anode electrode 12a and the cathode electrode 12c of the electric generator 12 may be made of a known electrode material for use as a catalytic layer for polymer electrolyte fuel cells (PEFC) or the like. For example, the anode electrode 12a and the cathode electrode 12c may be made of carbon black with platinum (Pt) carried thereby. The electrolytic membrane 12b may comprise a membrane capable of moving protons (hydrogen ions), i.e., a so-called proton-conducting membrane. For example, the electrolytic membrane 12b may be a perfluorosulfonate membrane, a hydrocarbon polymer membrane, an inorganic membrane, an organic-inorganic composite membrane, or the like.

When the anode electrode 12a is supplied with a hydrogen gas and the cathode electrode 12c is supplied with a water vapor, the electric generator 12 generates an electromotive force due to a hydrogen partial pressure difference developed between the anode electrode 12a and the cathode electrode 12c. Specifically, the hydrogen gas is dissociated into electrons and protons by the catalytic action of the anode electrode 12a according to the reaction formula (1) shown below. The electrons are supplied to a load 14 and move therethrough to the cathode electrode 12c. The protons move through the electrolytic membrane 12b to the cathode electrode 12c. In the cathode electrode 12c, the protons are recombined with the electrons that have moved to the cathode electrode 12c, producing a hydrogen gas (hydrogen molecules) according to the reaction formula (2) shown below. The hydrogen gas and the water vapor are discharged from the electric generator 12.

$$H_2 \rightarrow 2H^+ + 2e^- \quad (1)$$

$$2H^+ + 2e^- \rightarrow H_2 \quad (2)$$

The electromotive force generated by the electric generator 12 is determined by the hydrogen partial pressures and the temperatures of the anode electrode 12a and the cathode electrode 12c. The electromotive force V (V) is expressed by the following equation (3):

$$V = (RT/2F)\ln(Pa/Pc) \quad (3)$$

where R represents a gas constant, T the absolute temperature (K), F the Faraday constant, Pa the hydrogen partial pressure (Pascal) in the anode electrode 12a, and Pc the hydrogen partial pressure (Pascal) in the cathode electrode 12c.

As shown in FIG. 1, the electric generator 12 has an anode supply port 16 for supplying a hydrogen ($H_2$) gas as a reactive gas to the anode electrode 12a, an anode discharge port 18 for discharging an anode off-gas including an unreacted hydrogen gas from the anode electrode 12a, a cathode supply port 20 for supplying a hydrogen vapor (water) as a working medium to the cathode electrode 12c, and a cathode discharge port 22 for discharging a cathode off-gas (mixed gas) including the water vapor and a hydrogen gas generated when the protons and the electrons are recombined after the reaction, from the cathode electrode 12c.

The anode discharge port 18 is connected to an anode discharge passage (first discharge passage) 24, and the cathode discharge port 22 is connected to a cathode discharge passage (second discharge passage) 26. The anode discharge passage 24 and the cathode discharge passage 26 are connected to an ejector 28.

The ejector 28 has a nozzle (not shown) disposed therein for expelling the cathode off-gas from the cathode discharge passage 26 to develop a negative pressure. The ejector 28 attracts the anode off-gas flowing from the anode discharge passage 24 under the developed negative pressure, mixes the anode off-gas and the cathode off-gas with each other, and discharges the mixed gas. The ejector 28 may be of a known structure used for hydrogen gas circulation or the like in fuel cell systems or the like. The ejector 28 may be replaced with a hydrogen pump.

The cathode off-gas and the anode-off gas discharged from the ejector 28 are introduced into a gas-liquid separator 30. The gas-liquid separator 30 functions as a so-called condenser to cool the mixed gas of the cathode off-gas and the anode-off gas to condense the water contained in the mixed gas for thereby separating the mixed gas into a hydrogen gas and water.

The gas-liquid separator 30 has its upper portion connected to an anode supply passage (first supply passage) 32 which provides fluid communication between the gas-liquid separator 30 and the anode supply port 16 of the electric generator 12. The hydrogen gas separated in the gas-liquid separator 30 is supplied through the anode supply passage 32 to the electric generator 12.

The gas-liquid separator 30 has its lower portion connected to a cathode supply passage (second supply passage) 34 which provides fluid communication between the gas-liquid separator 30 and the cathode supply port 20 of the electric generator 12. The cathode supply passage 34 is connected to a circulation pump 36 and an evaporator 38 which are successively arranged in the order named from the gas-liquid separator 30. The circulation pump 36 delivers the water separated in the gas-liquid separator 30 through the cathode supply passage 34 to the evaporator 38. The evaporator 38 evaporates the water into a water vapor, and supplies the water vapor to the electric generator 12. The evaporator 38 functions to heat liquid-phase water introduced from the gas-liquid separator 30 into a water vapor with the waste heat discharged from an internal combustion engine, a fuel cell, or the like as described above.

In the thermoelectric conversion apparatus 10, the cathode supply passage 34 and the cathode discharge passage 26 serve as a circulation passage for circulating a working medium of water. Similarly, the anode supply passage 32 and the anode discharge passage 24 serve as a circulation passage for circulating a hydrogen gas as a reactive gas.

An expander 40 is connected to the cathode supply passage 34 between the outlet of the evaporator 38 and an inlet (the cathode supply port 20) of the electric generator 12. A compressor 42 is connected to the anode supply passage 32 between the outlet of the gas-liquid separator 30 and an inlet (the anode supply port 16) of the electric generator 12. The expander 40 and the compressor 42 are coaxially connected to each other by a drive shaft 44.

The expander 40 functions as a turbine driven (rotated) by the water vapor from the evaporator 38. When the expander 40 is rotated, it reduces the pressure of the water vapor and supplies the water vapor under the reduced pressure to the electric generator 12. At the same time, the expander 40 drives (rotates) the compressor 42. When the compressor 42 is rotated, it pressurizes the hydrogen gas supplied to the electric generator 12. The expander 40 and the compressor 42 jointly function as a hydrogen supercharger (reactive gas supercharger) 46.

The thermoelectric conversion apparatus 10 according to the first embodiment is basically constructed as described above. Operation of the thermoelectric conversion apparatus 10 will be described below.

As described above, the thermoelectric conversion apparatus 10 is in the form of a closed-cycle system, which contains a hydrogen gas and water sealed therein. When thermoelectric conversion apparatus 10 is not in operation, it is assumed that most of the water in the system of the thermoelectric conversion apparatus 10 is in a liquid phase and stored in the gas-liquid separator 30.

When the circulation pump 36 is actuated by a controller, not shown, the water stored in the gas-liquid separator 30 flows through the cathode supply passage 34 into the evaporator 38. At a point C1 before the inlet of the evaporator 38, the water has a temperature of about +100° C., for example.

The liquid-phase water introduced into the evaporator 38 is heated into a water vapor by the evaporator 38. The water vapor is also superheated by the evaporator 38. At a point C2 near the outlet of the evaporator 38, the water vapor has a temperature of about +250° C. and a pressure of about 1 MPa (about 10 atm), for example. In other words, according to the present embodiment, the heat source provided by the waste heat from the internal combustion engine or the fuel cell for heating the water vapor in the evaporator 38 has a temperature of about +250° C., for example.

The water vapor discharged from the evaporator 38 flows into the expander 40. The pressure energy of the water vapor is retrieved or recovered by the expander 40, i.e., the pressure of the water vapor is reduced by the expander 40. After having rotated (driven) the expander 40, the water vapor is supplied through the cathode supply port 20 to the cathode electrode 12c of the electric generator 12. At this time, the water vapor has a temperature of about +120° C. and a pressure of about 0.2 MPa (about 2 atm), for example, at a point C3 on the side of the outlet of the expander 40 or near the inlet (the cathode supply port 20) of the cathode electrode 12c.

The hydrogen gas sealed in the system of the thermoelectric conversion apparatus 10 is pressurized by the compressor 42 which is driven (rotated) by the expander 40 through the drive shaft 44. The pressurized hydrogen gas is supplied through the anode supply port 16 to the anode electrode 12a of the electric generator 12. At a point A1 near the inlet of the compressor 42, the hydrogen gas has a temperature of about +50° C. and a pressure of about 0.1 MPa (about 1 atm), for example. After the hydrogen gas has been pressurized (compressed) by the compressor 42, it has a pressure of about 0.4 MPa (about 4 atm), for example, at a point A2 on the side of the outlet of the compressor 42 or near the inlet (the anode supply port 16) of the electric generator 12.

When the anode electrode 12a of the electric generator 12 is supplied with the hydrogen gas and the cathode electrode 12c thereof with the water vapor, the electric generator 12 forms a concentration cell for electric power generation. At this time, since the cathode electrode 12c is supplied with the water vapor, the electrolytic membrane 12b is humidified by the water vapor. Because the water vapor has a relatively high temperature of about +120° C. in the cathode electrode 12c, it effectively suppresses a phenomenon of so-called flooding, i.e., the storage of water in the anode electrode 12a due to a reverse diffusion of water from the cathode electrode 12c to the anode electrode 12a.

The cathode off-gas, which includes the water vapor and the hydrogen gas generated when the protons and the electrons are recombined, discharged from the cathode discharge port 22 of the electric generator 12 to the cathode discharge passage 26 flows through the ejector 28 at a temperature of about +120° C. and a pressure of about 0.1 MPa (about 1 atm), for example, at a point C4 on the side of an outlet (the cathode discharge port 22) of the electric generator 12 or near the inlet of the ejector 28. The anode off-gas, which includes the unreacted gas, discharged from the anode discharge port 18 of the electric generator 12 to the anode discharge passage 24 is drawn by the ejector 28 and combined with the cathode off-gas thereby. The mixed gas is introduced from the ejector 28 into the gas-liquid separator 30.

In the gas-liquid separator 30, the mixed gas of the cathode off-gas and the anode off-gas is cooled to condense water. The mixed gas is now separated into a hydrogen gas and water.

The separated hydrogen gas has a temperature of about +50° C., for example, at a point A3 in the upper portion of the gas-liquid separator 30. The hydrogen gas flows through the anode supply passage 32 connected to the upper portion of the gas-liquid separator 30 and is supplied again to the electric generator 12. The separated water has a temperature of about +100° C. or lower at a point C5 within the gas-liquid separator 30. The water is stored in the gas-liquid separator 30. When the circulation pump 36 is actuated, the water flows from the gas-liquid separator 30 through the cathode supply passage 34 and is supplied again to the electric generator 12.

As described above, the thermoelectric conversion apparatus 10 according to the first embodiment converts thermal energy into electric energy in a closed cycle which is a combination of the Rankine cycle and a concentration cell.

Waste heat discharged from an internal combustion engine, a fuel-cell, or the like can effectively be used as the heat source for heating the working fluid of water in the evaporator 38 to generate electric power with the electric generator 12. Accordingly, the thermoelectric conversion apparatus 10 can convert thermal energy into electric energy highly efficiently. The electric generator 12 has an increased thermoelectric conversion efficiency as it can recover the energy (thermal energy, gravitational energy, etc.) required for the gas-liquid separator 30 to separate a hydrogen gas and water from each other.

The circulation pump 36 circulates liquid-phase water. Therefore, the circulation pump 36 can be actuated with a much smaller consumption of electric power than if it circulates gas-phase water, i.e., a water vapor.

The thermoelectric conversion apparatus 10 has the hydrogen supercharger 46 as a combination of the expander 40 and the compressor 42. The expander 40 effectively recovers pressure energy and kinetic energy of the water vapor, and transfers the recovered energy to the compressor 42, which pressurizes the hydrogen gas. Therefore, the pressure of the hydrogen in the anode electrode 12a is increased for enabling the electric generator 12 to generate a greater electromotive force. The increased pressure of the hydrogen in the anode electrode 12a is effective to suppress flooding in the anode electrode 12a for better electric power generation stability of the electric generator 12.

The anode discharge passage 24 for discharging the hydrogen gas as the unreacted reactive gas from the anode electrode 12a of the electric generator 12 is connected by the ejector 28 to the cathode discharge passage 26 for discharging the cathode off-gas (mixed gas) which includes the water vapor and the hydrogen gas generated when the protons and the electrons are recombined after the reaction, from the cathode electrode 12c. Consequently, the unreacted hydrogen gas discharged from the anode electrode 12a can be circulated highly efficiently.

The thermoelectric conversion apparatus 10 is in the form of a closed-cycle system, and the concentration cell utilizes dissociation and recombination of the hydrogen gas. Therefore, the thermoelectric conversion apparatus 10 consumes almost no hydrogen gas and water or holds the consumption of hydrogen gas and water to a minimum. The thermoelectric conversion apparatus 10 can thus operate at a low cost.

Figure 5:
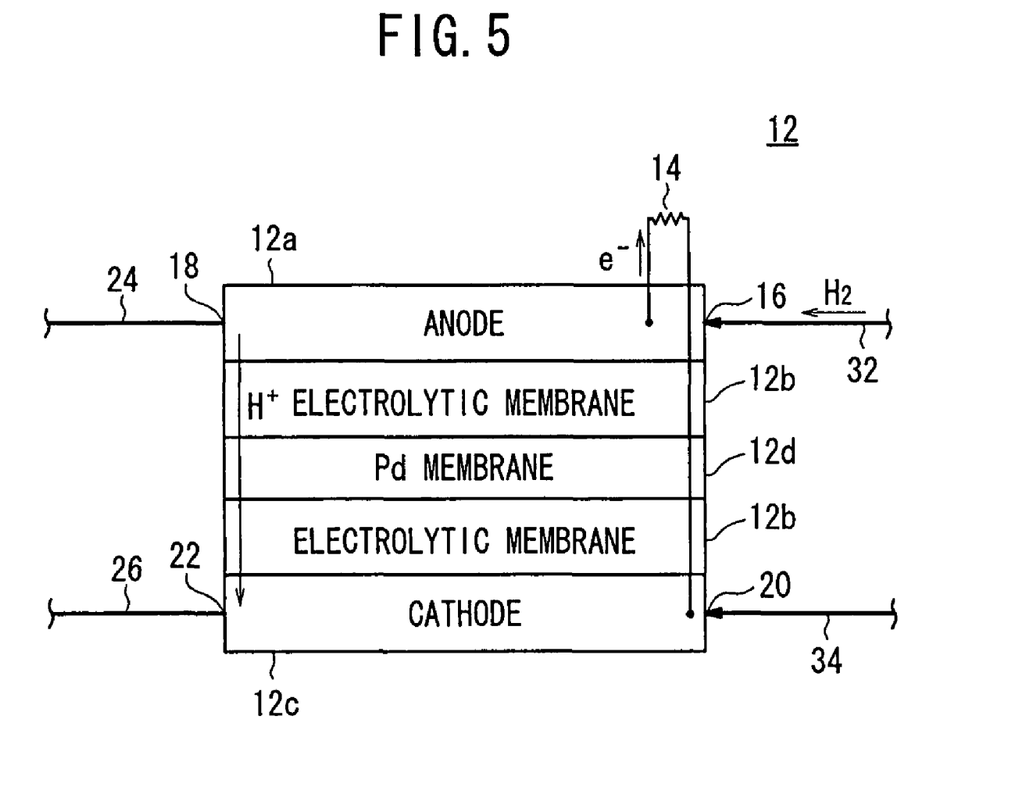
FIG. 5 is a schematic diagram of a modification of a generator of the thermoelectric conversion apparatus according to the present invention.

FIG. 5 shows a modification of the electric generator 12. As shown in FIG. 5, the cell of the electric generator 12 includes an anode electrode 12a, a cathode electrode 12c, two electrolytic membranes 12b disposed between the anode electrode 12a and the cathode electrode 12c, and a membrane (barrier layer) 12d sandwiched between the electrolytic membranes 12b. The membrane 12d is impermeable to water, but permeable to protons. The electric generator 12 shown in FIG. 15 is effective to reliably prevent water from passing from the cathode electrode 12c to the anode electrode 12a to achieve a high electric power generation efficiency in the concentration cell (electric generator 12) which tends to generate a lower electromotive force than fuel cells. The water-impermeable membrane 12d may comprise a palladium (Pd) membrane, a palladium-metal compound membrane (a Pd—Ag membrane or a Pd—Cu membrane), or the like.

The thermoelectric conversion apparatus 10 may employ an oxygen gas or the like as the reactive gas rather than a hydrogen gas. However, the hydrogen gas is preferable because it can be dissociated into electrons and protons by the catalytic action of the anode electrode 12a at a higher reaction rate than the oxygen gas or the like.

Figure 2:
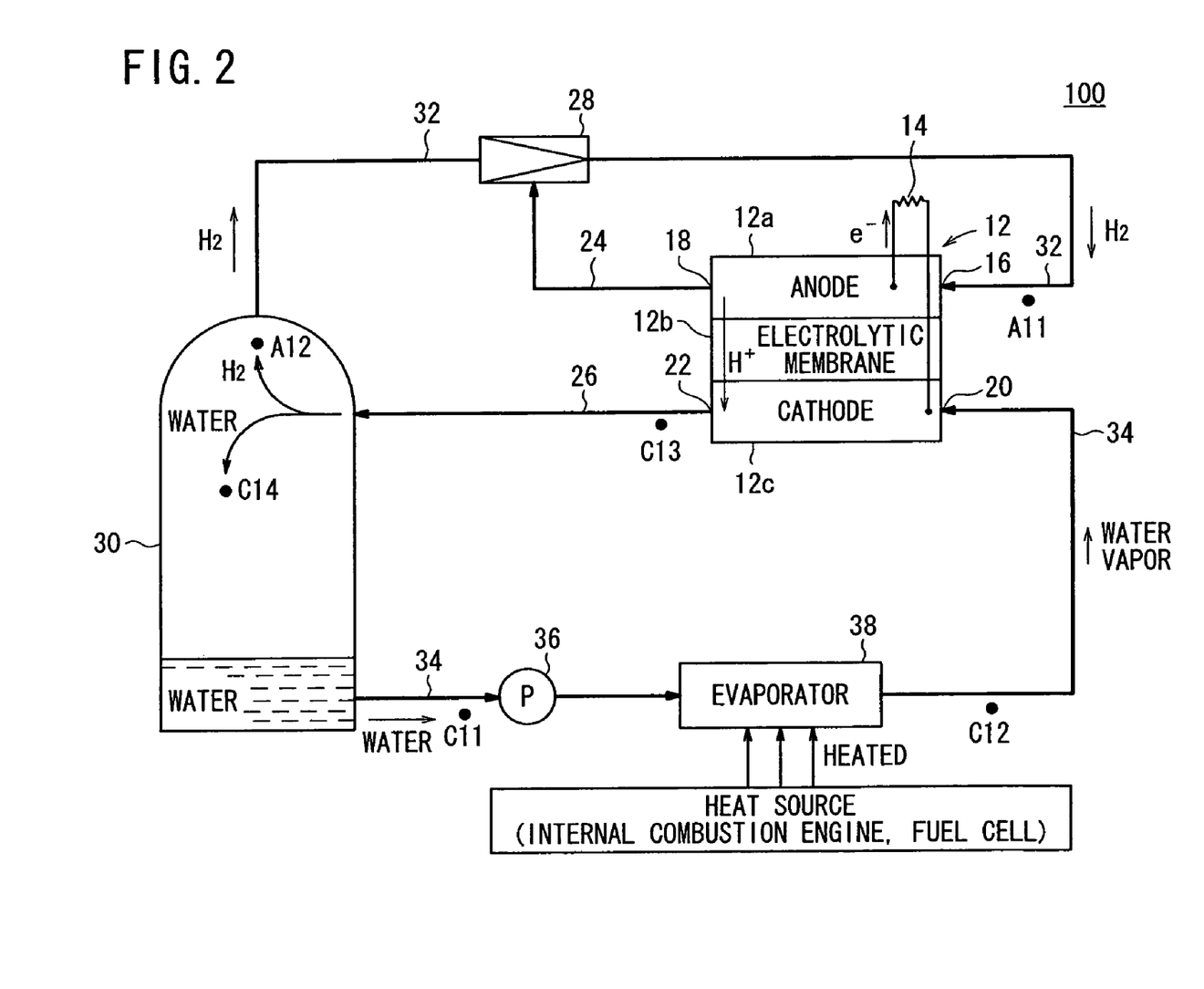
FIG. 2 is a schematic diagram of a thermoelectric conversion apparatus according to a second embodiment of the present invention.

A thermoelectric conversion apparatus according to a second embodiment of the present invention will be described below with reference to FIG. 2. FIG. 2 schematically shows the thermoelectric conversion apparatus, generally denoted by 100. Those parts of the thermoelectric conversion apparatus 100 which are identical to those shown in FIG. 1 are denoted by identical reference characters, and will not be described in detail below.

The thermoelectric conversion apparatus 100 according to the second embodiment differs from the thermoelectric conversion apparatus 10 according to the first embodiment in that it is free of the hydrogen supercharger 46 and the ejector 28 is connected to the anode supply passage 32, rather than the cathode discharge passage 26.

In the thermoelectric conversion apparatus 100, when the working medium of water is evaporated into a water vapor by the evaporator 38, the water vapor is directly supplied from the evaporator 38 to the electric generator 12, not via any expander. Therefore, the water vapor discharged from the evaporator 38 does not have its pressure and temperature lowered by the expander 40 that is used in the thermoelectric conversion apparatus 10, but is supplied to the electric generator 12 while maintaining its pressure and temperature. Therefore, the thermoelectric conversion apparatus 100 is capable of converting thermal energy into electric energy efficiently even if the heat source (waste heat discharged from an internal combustion engine, a fuel cell, or the like) for heating water in the evaporator 38 is of a relatively low temperature of about +120° C., for example.

Operation of the thermoelectric conversion apparatus 100 thus constructed will be described below. As with the thermoelectric conversion apparatus 10, the thermoelectric conversion apparatus 100 is also in the form of a closed-cycle system, and contains a hydrogen gas and water sealed therein.

When the circulation pump 36 of the thermoelectric conversion apparatus 100 is actuated by a controller, not shown, the water stored in the gas-liquid separator 30 flows through the cathode supply passage 34 into the evaporator 38. At a point C11 before the inlet of the evaporator 38, the water has a temperature of about +100° C., for example.

The liquid-phase water introduced into the evaporator 38 is heated into a water vapor by the evaporator 38. At a point C12 near the outlet of the evaporator 38, the water vapor has a temperature of about +120° C. and a pressure of about 0.2 MPa (about 2 atm), for example.

The water vapor discharged from the evaporator 38 is supplied through the cathode supply port 20 of the electric generator 12 to the cathode electrode 12c. The cathode off-gas discharged from the cathode discharge port 22 of the electric generator 12 to the cathode discharge passage 26 is introduced into the gas-liquid separator 30 at a temperature of about +120° C. and a pressure of about 0.1 MPa (about 1 atm), for example, at a point C13 on the side of the outlet (the cathode discharge port 22) of the electric generator 12 to the cathode discharge passage 26 or before the inlet of the gas-liquid separator 30.

The hydrogen gas sealed in the system of the thermoelectric conversion apparatus 100 gradually flows into the anode supply passage 32 under pressure energy and kinetic energy produced when the cathode off-gas introduced into the gas-liquid separator 30 is separated into a hydrogen gas and water.

When the hydrogen gas flowing through the anode supply passage 32 passes through the ejector 28, the hydrogen gas is drawn by the ejector 28 and combined with the anode off-gas that is drawn from the anode discharge passage 24 by the ejector 28. The mixed gas is supplied from the ejector 28 to the anode electrode 12a of the electric generator 12. The hydrogen gas supplied to the electric generator 12 has a pressure of about 0.2 MPa (about 2 atm), for example, at a point A11 near the inlet (the anode supply port 16) of the electric generator 12.

When the anode electrode 12a of the electric generator 12 is supplied with the hydrogen gas and the cathode electrode 12c thereof with the water vapor, the electric generator 12 forms a concentration cell for electric power generation.

The cathode off-gas introduced into the gas-liquid separator 30 is cooled and separated into a hydrogen gas and water by the gas-liquid separator 30. The condensed and separated water has a temperature of about +100° C., for example, at a point C14 within the gas-liquid separator 30. The water is stored in the gas-liquid separator 30. When the circulation pump 36 is actuated, the water flows from the gas-liquid separator 30 through the cathode supply passage 34 and is supplied again to the electric generator 12. The separated hydrogen has a temperature of about +50° C., for example, at a point A12 in the upper portion of the gas-liquid separator 30. The hydrogen gas flows through the anode supply passage 32 connected to the upper portion of the gas-liquid separator 30 and is supplied through the ejector 28 again to the electric generator 12.

As described above, the thermoelectric conversion apparatus 100 according to the second embodiment converts thermal energy into electric energy in a closed cycle which is a combination of the Rankine cycle and a concentration cell.

In the thermoelectric conversion apparatus 100, the water vapor discharged from the evaporator 38 is directly supplied to the electric generator 12, not via any expander. Therefore, the water vapor discharged from the evaporator 38 does not have its pressure and temperature lowered by any expander, but is supplied to the electric generator 12 while maintaining its pressure and temperature. Therefore, the thermoelectric conversion apparatus 100 is preferable especially when the heat source for heating water in the evaporator 38 is of a relatively low temperature of about +120° C., for example.

The thermoelectric conversion apparatus 100 is thus capable of obtaining electric energy from thermal energy of a heat source having a relatively low temperature. The thermoelectric conversion apparatus 100 is also less costly to construct as it has no hydrogen supercharger.

The anode discharge passage 24 for discharging the hydrogen gas as the unreacted reactive gas from the anode electrode 12a of the electric generator 12 is connected through the ejector 28 to the anode supply passage 32. Consequently, the unreacted hydrogen gas discharged from the anode electrode 12a is circulated highly efficiently through the system.

Figure 3:
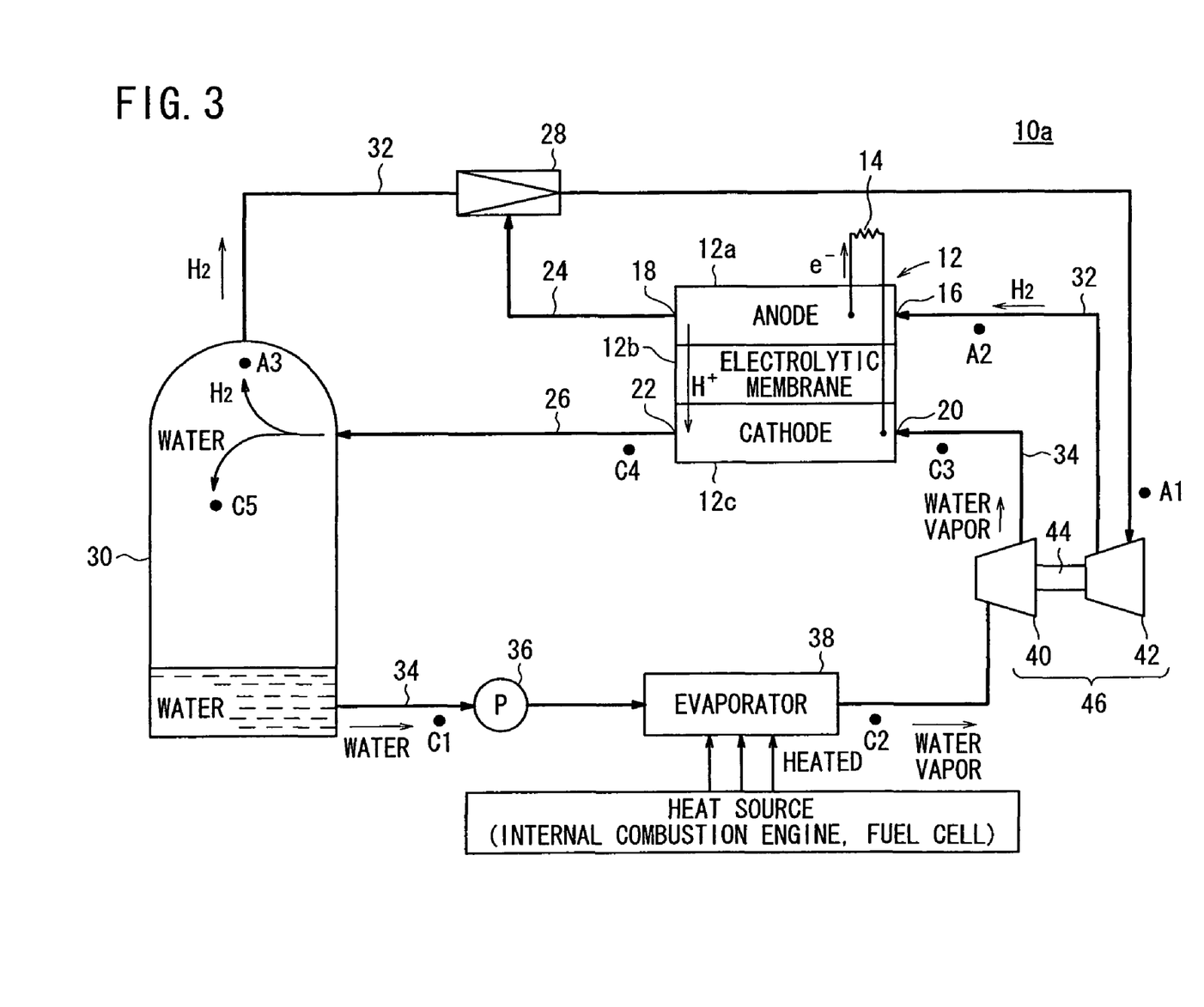
FIG. 3 is a schematic diagram of a modification of the thermoelectric conversion apparatus according to the first embodiment of the present invention.

FIG. 3 schematically shows a modification of the thermoelectric conversion apparatus 10 according to the first embodiment of the present invention. According to the modification shown in FIG. 3, a thermoelectric conversion apparatus 10a has the ejector 28 connected to the anode supply passage 32 and the anode discharge passage 24, as with the thermoelectric conversion apparatus 100 according to the second embodiment.

Figure 4:
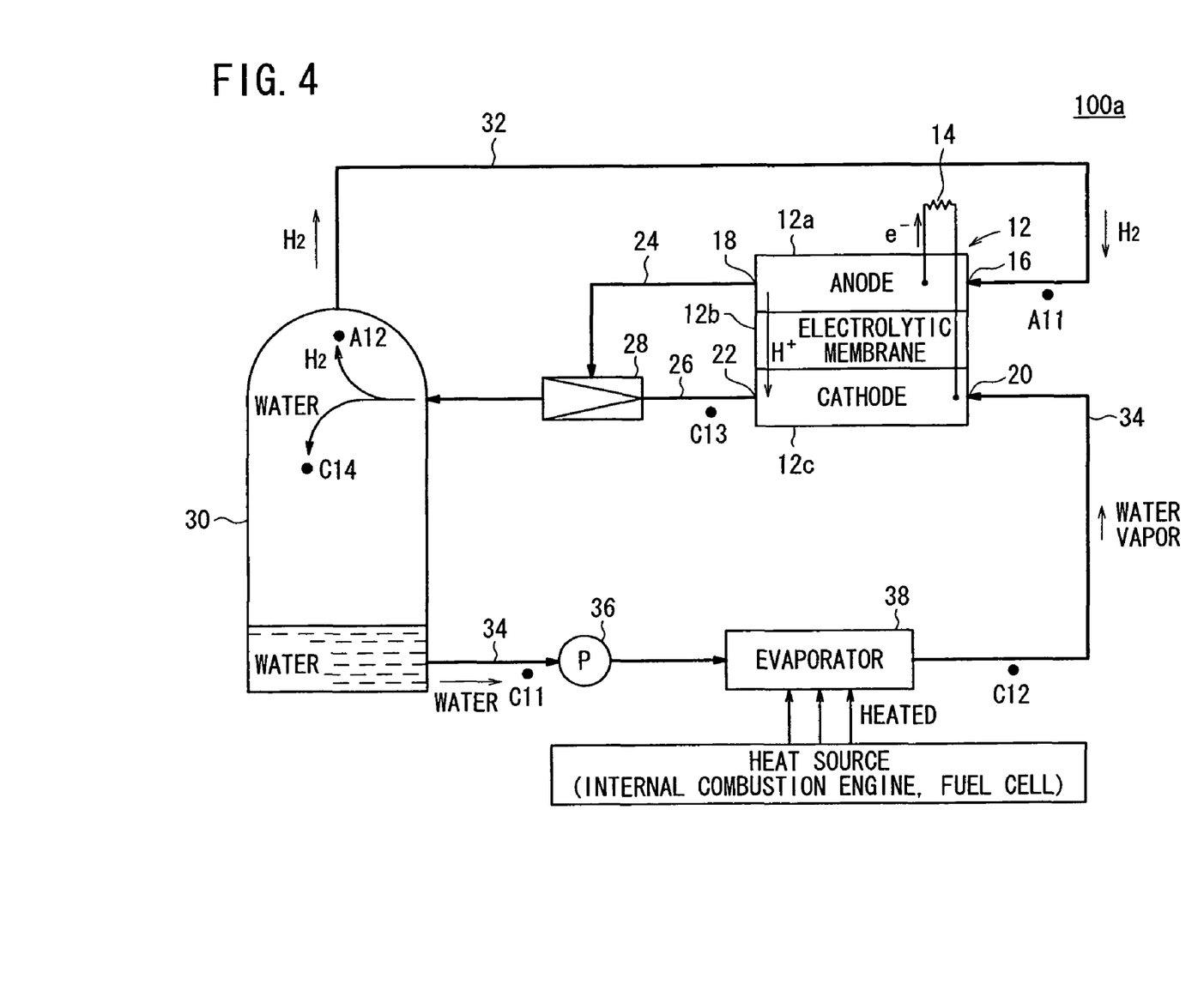
FIG. 4 is a schematic diagram of a modification of the thermoelectric conversion apparatus according to the second embodiment of the present invention.

FIG. 4 schematically shows a modification of the thermoelectric conversion apparatus 100 according to the second embodiment of the present invention. According to the modification shown in FIG. 4, a thermoelectric conversion apparatus 10a has the ejector 28 connected to the cathode discharge passage 26 and the anode discharge passage 24, as with the thermoelectric conversion apparatus 10 according to the first embodiment.

The heat source for heating the working medium in the evaporator 38 may be a heat source other than waste heat discharged from an internal combustion engine, a fuel cell, etc. For example, the heat source may be waste heat from a factory, solar heat, geothermal heat, or the like.

Although certain preferred embodiments of the present invention have been shown and described in detail, it should be understood that various changes and modifications may be made therein without departing from the scope of the appended claims.

What is claimed is:

1. A thermoelectric conversion apparatus comprising:
   an evaporator for heating a working medium in liquid-phase to evaporate said working medium;
   an electric generator having an anode electrode for being supplied with a reactive gas and a cathode electrode for being supplied with said working medium evaporated by said evaporator, said electric generator forming a concentration cell for electric power generation when said anode electrode is supplied with said reactive gas and said cathode electrode is supplied with said evaporated working medium;
   a gas-liquid separator for being supplied with a mixed gas of said reactive gas which has reacted in said concentration cell and said working medium, from said cathode electrode, and condensing said working medium to separate said mixed gas into said working medium and said reactive gas, wherein said gas-liquid separator is supplied with said mixed gas and an unreacted reactive gas discharged from said anode electrode;
   a first supply passage for supplying said reactive gas separated by said gas-liquid separator to said electric generator; and
   a second supply passage for supplying said working medium in liquid phase separated by said gas-liquid separator through said evaporator to said electric generator.

2. A thermoelectric conversion apparatus according to claim 1, further comprising:
   an expander connected to said second supply passage between an outlet of said evaporator and an inlet of said electric generator, said expander being driven by said working medium evaporated by said evaporator; and
   a compressor connected to said first supply passage between an outlet of said gas-liquid separator and an inlet of said electric generator, said compressor being rotated coaxially with said expander for compressing said reactive gas supplied to said electric generator.

3. A thermoelectric conversion apparatus according to claim 2, further comprising:
   a first discharge passage for discharging an unreacted reactive gas from said anode electrode of said electric generator;
   a second discharge passage for discharging said mixed gas from said cathode electrode; and
   an ejector;
   said first discharge passage being connected through said ejector to said second discharge passage or said first supply passage.

4. A thermoelectric conversion apparatus according to claim 3, for use as a closed-cycle system.

5. A thermoelectric conversion apparatus according to claim 1, wherein said reactive gas comprises a hydrogen gas, and said working medium comprises water.

6. A thermoelectric conversion apparatus according to claim 1, further comprising:
   a first discharge passage for discharging an unreacted reactive gas from said anode electrode of said electric generator;
   a second discharge passage for discharging said mixed gas from said cathode electrode; and
   an ejector;
   said first discharge passage being connected through said ejector to said second discharge passage or said first supply passage.

7. A thermoelectric conversion apparatus according to claim 6, for use as a closed-cycle system.

8. A thermoelectric conversion apparatus according to claim 1, further comprising a circulation pump for circulating said working medium, said circulation pump being connected to said second supply passage.

9. A thermoelectric conversion apparatus according to claim 1, wherein said evaporator heats said working medium with a heat source of waste heat discharged from an internal combustion engine or a fuel cell.

10. A thermoelectric conversion apparatus according to claim 1, for use as a closed-cycle system.

* * * * *